United States Patent
Denby et al.

(10) Patent No.: US 10,348,895 B2
(45) Date of Patent: Jul. 9, 2019

(54) PREDICTION OF CONTACT CENTER INTERACTIONS

(71) Applicant: Avaya Inc., Santa Clara, CA (US)

(72) Inventors: Lorraine Denby, Berkeley Heights, NJ (US); Wen-Hua Ju, Monmouth Junction, NJ (US); Patrick Tendick, Basking Ridge, NJ (US)

(73) Assignee: Avaya Inc., Santa Clara, CA (US)

( * ) Notice: Subject to any disclaimer, the term of this patent is extended or adjusted under 35 U.S.C. 154(b) by 50 days.

(21) Appl. No.: 14/622,718

(22) Filed: Feb. 13, 2015

(65) Prior Publication Data
US 2016/0241712 A1 Aug. 18, 2016

(51) Int. Cl.
H04M 3/51 (2006.01)
H04M 7/00 (2006.01)

(52) U.S. Cl.
CPC ........ *H04M 3/5166* (2013.01); *H04M 7/0042* (2013.01); *H04M 2203/551* (2013.01); *H04M 2203/556* (2013.01)

(58) Field of Classification Search
CPC ............. H04M 3/5166; H04M 3/5175; H04M 3/5183; H04M 7/0042; H04M 2203/551; H04M 2203/556; G06Q 10/063112
See application file for complete search history.

(56) References Cited

U.S. PATENT DOCUMENTS

| | | | |
|---|---|---|---|
| 7,242,752 B2* | 7/2007 | Chiu ....................... | G10L 15/22 379/88.04 |
| 8,233,613 B1 | 7/2012 | Michaelis et al. | |
| 8,363,796 B2* | 1/2013 | Adkar .................. | H04M 3/493 379/202.01 |
| 8,369,495 B1 | 2/2013 | Channakeshava | |
| 8,553,859 B1* | 10/2013 | Lavian .................. | H04M 3/493 379/88.18 |
| 8,565,411 B2* | 10/2013 | Kannan ............... | H04L 12/1827 379/265.13 |
| 8,767,948 B1* | 7/2014 | Riahi ................... | G06N 99/005 379/265.02 |
| 9,118,760 B2* | 8/2015 | Atef ........................ | H04L 67/34 |
| 9,118,763 B1* | 8/2015 | Margulies ........... | H04M 3/5191 |

(Continued)

OTHER PUBLICATIONS

U.S. Appl. No. 14/673,515, filed Mar. 30, 2015, Shaffer et al.

(Continued)

*Primary Examiner* — Lisa Hashem
(74) *Attorney, Agent, or Firm* — Avaya Inc.

(57) ABSTRACT

In order to provide better service with self-service applications, metrics for a communication session between a user and a self-service application are identified. Based on the metrics, a pattern is determined that will likely predict an initial outcome of the communication session with the self-service application. In response to determining that the pattern will likely predict the initial outcome of the communication session with the self-service application, the way the user is managed in the communication session is changed. For example, if a particular pattern of IVR responses is detected that will likely lead to a caller abandoning a voice call, the voice call can be automatically transferred from the IVR system to a contact center agent. This provides for increased customer satisfaction and better utilization of contact center resources.

20 Claims, 4 Drawing Sheets

(56) References Cited

U.S. PATENT DOCUMENTS

| | | | | |
|---|---|---|---|---|
| 9,247,066 B1* | 1/2016 | Stec | | H04M 3/5235 |
| 9,313,332 B1* | 4/2016 | Kumar | | H04M 3/5232 |
| 9,648,164 B1* | 5/2017 | Harris | | H04M 3/4365 |
| 9,654,633 B2* | 5/2017 | McCord | | H04M 3/5183 |
| 9,667,789 B2* | 5/2017 | Odinak | | H04W 4/12 |
| 9,742,916 B1* | 8/2017 | Christopher | | H04M 3/5183 |
| 9,762,733 B1* | 9/2017 | Ramanujaiaha | | H04M 3/5183 |
| 9,871,919 B1* | 1/2018 | Stec | | H04M 3/5183 |
| 9,922,649 B1* | 3/2018 | LoRe | | G10L 15/22 |
| 2003/0235282 A1* | 12/2003 | Sichelman | | G06Q 10/02 |
| | | | | 379/201.03 |
| 2004/0122941 A1 | 6/2004 | Creamer et al. | | |
| 2006/0109975 A1* | 5/2006 | Judkins | | H04M 3/5233 |
| | | | | 379/265.02 |
| 2007/0133759 A1 | 6/2007 | Malik et al. | | |
| 2007/0165808 A1* | 7/2007 | Pieraccini | | H04M 3/493 |
| | | | | 379/142.04 |
| 2008/0021762 A1* | 1/2008 | Coon | | G06Q 10/06 |
| | | | | 705/7.32 |
| 2008/0118051 A1* | 5/2008 | Odinak | | H04W 4/12 |
| | | | | 379/265.09 |
| 2008/0260128 A1 | 10/2008 | Conway et al. | | |
| 2009/0168989 A1* | 7/2009 | Perlmutter | | H04M 3/4217 |
| | | | | 379/265.09 |
| 2009/0232283 A1* | 9/2009 | Zhang | | H04M 3/523 |
| | | | | 379/80 |
| 2010/0091960 A1* | 4/2010 | Ervin | | H04M 3/493 |
| | | | | 379/88.18 |
| 2010/0161337 A1* | 6/2010 | Pulz | | G10L 15/005 |
| | | | | 704/257 |
| 2010/0162101 A1* | 6/2010 | Anisimov | | H04M 3/5183 |
| | | | | 715/239 |
| 2010/0166158 A1 | 7/2010 | Costello et al. | | |
| 2010/0208873 A1* | 8/2010 | Chambers | | H04M 3/42391 |
| | | | | 379/52 |
| 2010/0332287 A1* | 12/2010 | Gates | | G06F 17/277 |
| | | | | 705/7.32 |
| 2013/0051545 A1* | 2/2013 | Ross | | H04M 3/523 |
| | | | | 379/265.02 |
| 2013/0129076 A1* | 5/2013 | Kannan | | H04M 3/5175 |
| | | | | 379/265.09 |
| 2013/0198039 A1* | 8/2013 | Sridharan | | G06Q 30/016 |
| | | | | 705/26.44 |
| 2014/0079207 A1* | 3/2014 | Zhakov | | H04M 3/5175 |
| | | | | 379/265.03 |
| 2014/0081636 A1* | 3/2014 | Erhart | | G06Q 50/01 |
| | | | | 704/236 |
| 2014/0143373 A1* | 5/2014 | Vitaly | | H04L 65/10 |
| | | | | 709/217 |
| 2015/0046158 A1* | 2/2015 | Efrati | | G10L 21/003 |
| | | | | 704/235 |
| 2015/0071418 A1* | 3/2015 | Shaffer | | H04M 3/493 |
| | | | | 379/88.01 |
| 2015/0117632 A1* | 4/2015 | Konig | | H04M 3/5233 |
| | | | | 379/265.12 |
| 2015/0149916 A1* | 5/2015 | Mendez | | G06F 17/2247 |
| | | | | 715/738 |
| 2015/0220619 A1* | 8/2015 | Gray | | G06F 17/30598 |
| | | | | 707/738 |
| 2015/0227941 A1* | 8/2015 | Tuchman | | H04M 3/5166 |
| | | | | 705/7.14 |
| 2015/0235240 A1* | 8/2015 | Chang | | G06Q 30/0202 |
| | | | | 705/7.31 |
| 2015/0242410 A1* | 8/2015 | Pattabhiraman | | G06Q 10/06 |
| | | | | 707/728 |
| 2015/0281445 A1* | 10/2015 | Kumar | | H04M 3/5166 |
| | | | | 379/88.01 |
| 2015/0358468 A1* | 12/2015 | Erhart | | H04M 3/5233 |
| | | | | 379/265.12 |
| 2016/0012818 A1* | 1/2016 | Faizakof | | G06F 17/30705 |
| | | | | 704/245 |
| 2016/0065738 A1* | 3/2016 | Schwartz | | G06Q 30/016 |
| | | | | 379/265.03 |
| 2016/0088153 A1* | 3/2016 | Wicaksono | | H04M 3/523 |
| | | | | 379/265.06 |
| 2016/0105543 A1* | 4/2016 | Ponting | | H04M 3/2227 |
| | | | | 379/1.03 |
| 2016/0112568 A1* | 4/2016 | Nowak | | H04M 3/5233 |
| | | | | 379/265.05 |
| 2016/0150085 A1* | 5/2016 | McCormack | | H04M 3/5232 |
| | | | | 379/265.11 |
| 2016/0275523 A1* | 9/2016 | McNea | | G06Q 30/016 |
| 2017/0006161 A9* | 1/2017 | Riahi | | G06Q 30/02 |
| 2017/0118340 A1* | 4/2017 | Kumar | | H04M 3/5166 |
| 2018/0084111 A1* | 3/2018 | Pirat | | H04M 3/5183 |
| 2018/0124243 A1* | 5/2018 | Zimmerman | | H04M 3/5175 |

OTHER PUBLICATIONS

"Vivid Speech—Data Sheet," [24]7, May 2014, 2 pages [retrieved from: http://www.247-inc.com/sites/default/files/asset-downloads/247-dsvs-vivid-speech0314-external.pdf].

Official Action for United Kingdom Patent Application No. GB1602573.6, dated Jun. 21, 2016 11 pages.

* cited by examiner

PREDICTION OF CONTACT CENTER INTERACTIONS

TECHNICAL FIELD

The systems and methods disclosed herein relate to contact centers and in particular to prediction of contact center interactions.

BACKGROUND

Contact centers traditionally use agents to handle all their remote customer interactions, i.e., via voice calls. Self-service applications, such as Interactive Voice Response (IVR) systems, were instituted to handle these interactions without human intervention or with reduced human intervention. By handling some of the routine data gathering activities prior to involvement by a contact center agent, an IVR system can offload contact center agents. Employing the self-service applications is not only a cost savings addition to a contact center, but also can be an efficient way for the caller to obtain routine information, such as a bank balance.

When companies install a self-service application, the goal is to contain as many of the interactions within the self-service application as possible. However, sometimes customers are unsuccessful in dealing with the self-service application. For example, if a customer cannot understand an IVR menu or does not find an IVR menu that meets the customer's needs, the customer may become frustrated. This may cause the customer to abandon a communication session. Alternatively, the customer may opt out of the self-service application to talk to an agent when the customer could have remained within the self-service application to accomplish his or her task.

Similar goals exist for the alternate channels, such as email, chat, or Short Message Service (SMS). It is in the best interest of a company to have the customer be successful within the alternate channel, or at a minimum, accomplish as much as possible within the alternate channel before transferring the interaction to a contact center agent. If the customer becomes frustrated during the interaction on the alternate channel, the customer may opt out of the alternate channel to talk directly to an agent or may abandon the interaction altogether. What is needed is a solution that overcomes these problems.

SUMMARY

Systems and methods are provided to solve these and other problems and disadvantages of the prior art. In order to provide better service with self-service applications, metrics for a communication session between a user and a self-service application are identified. Based on the metrics, a pattern is determined that will likely predict an initial outcome of the communication session with the self-service application. In response to determining that the pattern will likely predict the initial outcome of the communication session with the self-service application, a way of managing the user is changed. For example, if a particular pattern of IVR responses is detected that will likely lead to a caller abandoning a voice call, the voice call can be automatically transferred from the IVR system to a contact center agent. This provides for increased customer satisfaction and better utilization of contact center resources.

DETAILED DESCRIPTION

Figure 1:
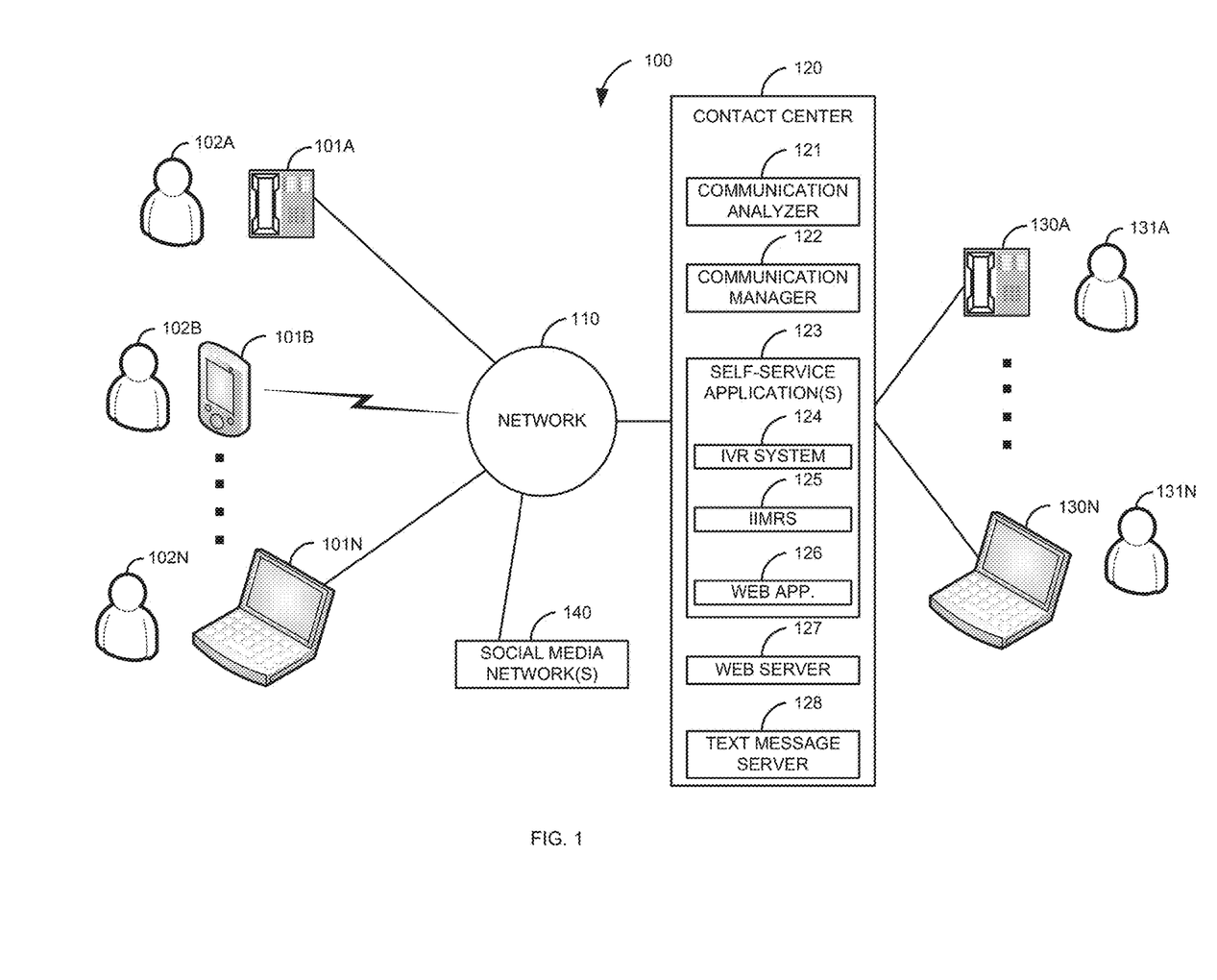
FIG. 1 is a block diagram of a first illustrative system for prediction of contact center interactions.

FIG. 1 is a block diagram of a first illustrative system 100 for prediction of contact center interactions. The first illustrative system 100 comprises communication endpoints 101A-101N, a network 110, a contact center 120, agent terminals 130A-130N, and social media network(s) 140.

The communication endpoint 101 can be or may include any endpoint device that can communicate on the network 110, such as a Personal Computer (PC), a telephone, a video phone, a cellular telephone, a Personal Digital Assistant (PDA), a tablet device, a notebook device, a smart phone, and the like. As shown in FIG. 1, any number of communication endpoints 101A-101N may be connected to the network 110, including only a single communication endpoint 101. The communication endpoints 101A-101N also have an associated user 102A-102N. The users 102A-102N can be any user that uses the associated communication endpoint 101. The users 102A-102N are human users. In some embodiments, there may be more than one user 102 using an individual communication endpoint 101.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, text messaging protocols, Instant Messaging (IM) protocols, email protocols, SMS protocols, a combination of these, and the like. Thus, the network 110 is an electronic communication network that allows for sending of messages via packets and/or circuit switched communications.

The contact center 120 can be or may include any hardware/software that can provide communication services, such as a switch, a router, a Private Branch Exchange (PBX), a session manager, a central office cloud service, and/or the like. The contact center 120 further comprises a communication analyzer 121, a communication manager 122, one or more self-service applications 123, a web server 127, and a text message server 128.

The communication analyzer 121 can be, or may include any software/hardware that can analyze a communication, such as a digital signaling processor, a digital signaling software application, a text analyzer, a voice to text converter, and/or the like. The communication analyzer 121 can analyze a variety of communications, such as voice communications, video communications, text messaging, emails, IM sessions, chat sessions, a combination of these, and the like. In this embodiment, the communication analyzer 121 is shown as part of the contact center 120. However, the communication analyzer 121 may reside separately from the contact center 120, such as, on a separate server and/or on a communication endpoint 101.

The communication manager 122 can be, or may include any hardware/software that can manage or change how a communication is being handled, such as a voice call router, a video call router, an email router, a text messaging router, an IVR program manager, the web server 127, a session manager, a combination of these, and the like. The communication manager 122 can manage or change a type of media for a communication session. For example, the communication manager 122 can transfer a voice call to an IM session, email session, text chat session, text messaging session, video session, and/or the like. In this embodiment, the communication manager 122 is shown as part of the contact center 120. However, the communication manager 122 may reside separately from the contact center 120, such as, on a separate server.

The self-service application(s) 123 can be, or may include any hardware/software that can provide self-service to a user 102. The self-service application(s) 123 can provide self-service to a user 102 in a variety of media, such as voice, video, text media, sign language, and/or the like. In this embodiment, the self-service application(s) 123 are shown as part of the contact center 120. However, the self-service application(s) 123 may reside separately from the contact center 120, such as, on a separate server.

In this illustrative embodiment, the self service application(s) 123 comprise an IVR system 124, an Interactive Instant Messaging Response System (IIMRS) 125, and a web application 126. In other embodiments, the self-service application(s) 123 may include one or more of the self-service applications 124-126 and/or different self-service applications 123, such as a video IVR system.

The IVR system 124 can be, or may include any hardware/software that can interact with a user 102 via voice communications, such as a digital signaling processor, a digital signaling application, an IVR server, and/or the like. The IVR system 124 is shown as part of the contact center 120. However, in other embodiments, the IVR system 124 may reside on a separate server. The IVR system 124 can contain a number of menus (a plurality of menus) that allows the user 102 to navigate through the IVR system 124. For example, when the user 102 calls into the contact center 120, the IVR system 124 can provide an IVR initial menu (via voice) that provides options (a menu) for different products (e.g., electronics, tools, kitchen appliances, etc.). Once the user 102 selects a menu item (e.g., electronics), the user 102 is provided a second IVR menu (e.g., TVs, computers, cell phones, etc.). The user 102 can then select one of these options to continue to navigate through the IVR menus.

The IIMRS 125 can be, or may include any hardware/software that can interact with a user 102 via text communications, such as, a text messaging application, an interactive chat application, and/or the like.

The web application 126 can be or may include any hardware/software that can interact with a user 102 to provide services for the contact center 120. The web application 126 can use a variety of protocols, menus, links, and/or the like to provide self-service for the user 102.

The web server 127 can be, or may include any hardware/software that can provide web services to the communication endpoints 101A-101N and/or the agent terminals 130A-130N. The web server 127 can provide communication sessions to the communication endpoints 101A-101N/agent terminals 130A-130N, such as video communications, audio communications, text communications, IM communications, chat communication, email communications, and/or the like.

The text message server 128 can be, or may include any hardware/software that can provide text services, such as, an email server, a text messaging server, an IM server, a chat server, and/or the like.

The agent terminals 130A-130N can be or may include any device that can communicate with the contact center 120, such as the communication endpoint 101. The agent terminals 130A-130N have an associated contact center agent 131A-131N that uses the associated agent terminal 130. In FIG. 1, the agent terminals 130A-130N are shown directly connecting to the contact center 120. However, in other embodiments, the agent terminals 130A-130N can be connected via the network 110 (e.g. the Public Switched Telephone Network (PSTN)), or via a second network 110, such as a Local Area Network.

The social media network(s) 140 can be or may include any type of social media network 140 that can have interactions between two or more users 102. For example, the social media network 140 can be a common social media network 140, such as Facebook®, Twitter®, Linkedin®, and/or the like. The social media network(s) 140 are shown separately from the contact center 120. However, in another embodiment, the social media network 140 may be provided directly by the contact center 120 via the web server 127. For example, the contact center 120 may provide a blog site for products that the contact center supports.

Figure 2:
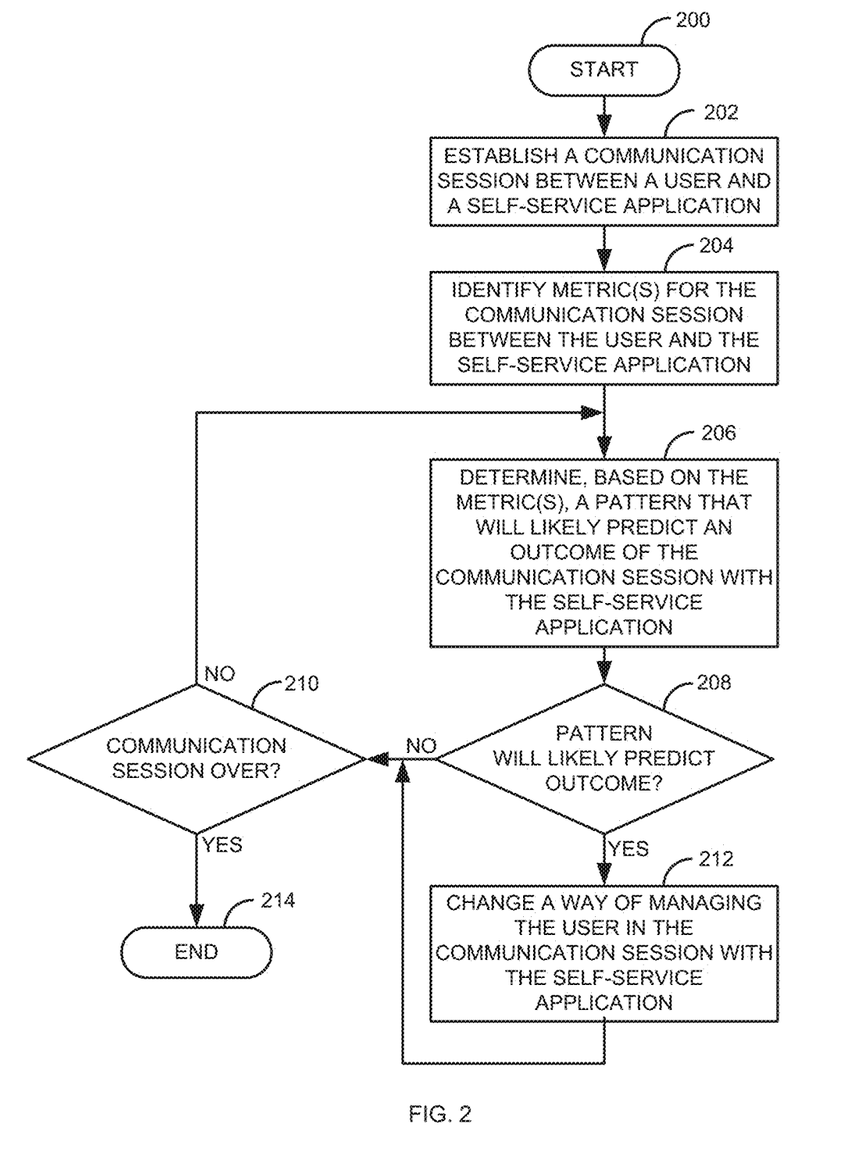
FIG. 2 is a flow diagram of a process for prediction of contact center interactions with self-service applications.
Figure 3:
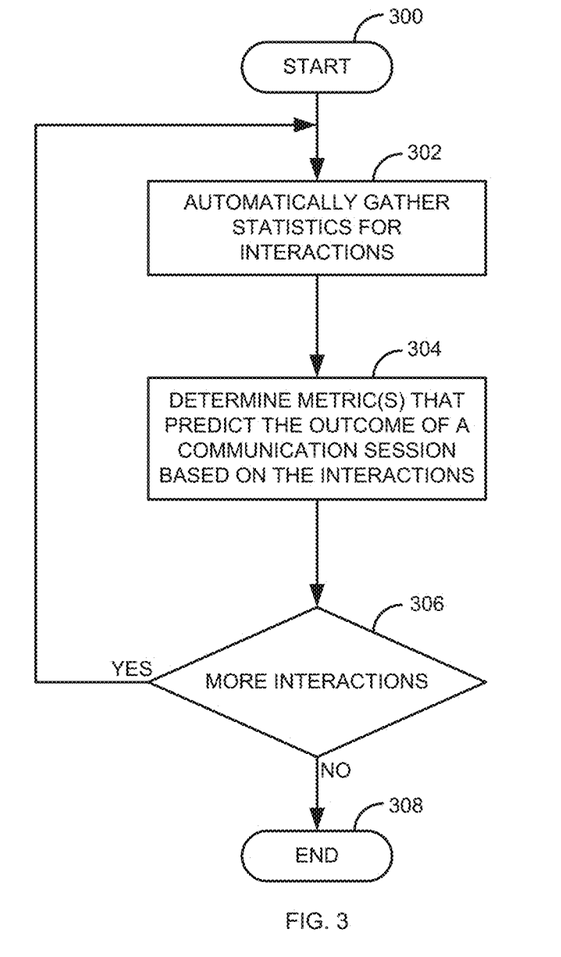
FIG. 3 is a flow diagram of a process for identifying one or more metrics that predict an initial outcome of a communication session.
Figure 4:
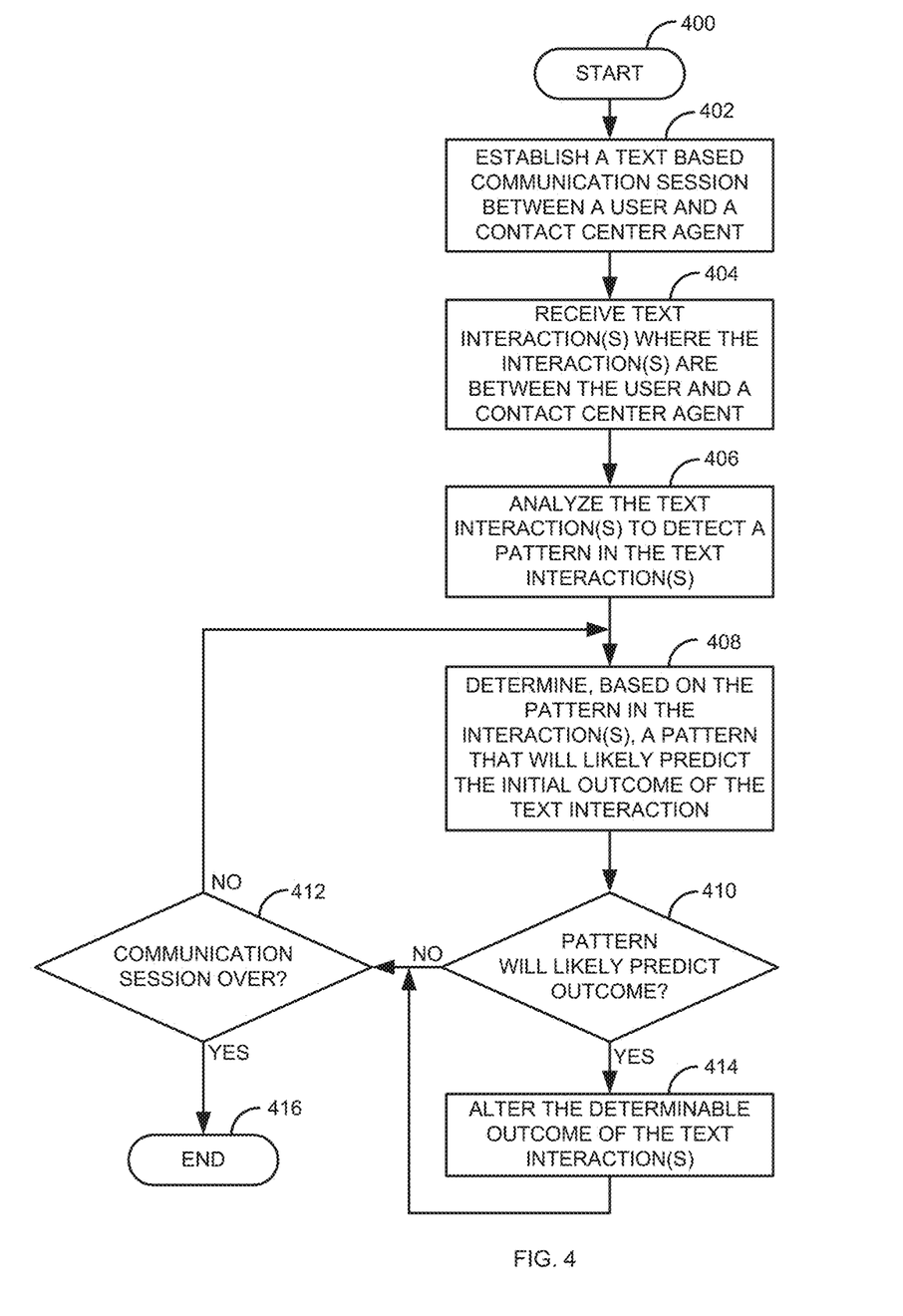
FIG. 4 is a flow diagram of a process for prediction of contact center interactions using text based communications.

FIG. 2 is a flow diagram of a process for prediction of contact center interactions with the self-service applications 123. Illustratively, the communication endpoints 101A-101N, the contact center 120, the communication analyzer 121, the communication manager 122, the self-service application(s) 123, the IVR 124, the IIMRS 125, the web application 126, the web server 127, the text message server 128, the agent terminals 130, and the social media network(s) 140 are stored-program-controlled entities, such as a computer or processor, which performs the method of FIGS. 2-4 and the processes described herein by executing program instructions stored in a tangible computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The process establishes a communication session between the user 102 (via the communication endpoint 101) and the self-service application 123 in step 202. The process can establish the communication session in various ways using various types of media, such as, voice, video, and/or text. For example, the communication manager 122 can establish a voice communication session between the user 102A (via the communication endpoint 101A) and the IVR system 124. Alternatively, the text message server 128 can establish an IM communication session between the user 102N (via the communication endpoint 101N) and the IIMRS 125. In another embodiment, the web server 127 can establish a web communication session between the user 102B (via the communication endpoint 101B) and the web application 126.

The communication analyzer 121 identifies one or more metrics for the communication session between the user 102 and the self-service application 123 in step 204. The communication analyzer 121 can identify the one or more metrics in various ways, such as, based on a profile, based on a specific type of communication media of the communication session, based on an administered set of metrics, based on metrics gathered from previous communication sessions/interactions (i.e., as described in FIG. 3), and/or the like. The one or more metrics can include various metrics, such as, a number of invalid responses to an IVR menu, a number of replays of an the IVR menu (i.e., the user 102 does not find the IVR menu item he/she is looking for), a number of non-responses to the IVR menu (i.e., the user 102 cannot understand menus), navigation of different paths of a plurality of IVR menus (i.e., the user 102 has navigated defined paths), a time in responding to the IVR menu, a path navigated through a plurality of IVR menus, a communication session history of the user 102, a telephone number of the user 102, an area code of the telephone number of the user 102, a language or dialect spoken or selected by the user 102, one or more IVR menu choices, a user category, a user history, if the user 102 has installed an application on their communication endpoint 101, demographic information of the user 102, and/or the like.

The communication analyzer 121 determines, based on the identified metric(s), a pattern that will likely predict an initial outcome of the communication session with the self-service application 123 in step 206. If the pattern will likely predict the initial outcome of the communication session in step 208, the communication manager 122 changes a way of managing the user in the communication session with the self-service application 123 in step 212 and the process goes to step 210. Otherwise, if the communication analyzer 121 determines that the pattern will not likely predict the initial outcome of the communication session with the self-service application 123, the communication manager 122 determines, in step 210, if the communication session with the self-service application 123 is over. If the communication session with the self-service application 123 is over in step 210, the process ends in step 214. Otherwise, if the communication session with the self-service application 123 is not over in step 208, the process goes to step 206.

A pattern that will likely predict the initial outcome of the communication session can be determined in various ways. The pattern can be based on a defined threshold, on a threshold for an event, on an event or sequence of events, and/or the like. For example, the communication analyzer 121 can determine, based on prior voice communication sessions that if a user 102 takes longer than thirty seconds on an individual IVR menu there is a 70% chance that the user 102 will abandon the voice communication session. Based on the pattern of taking longer than 30 seconds, the communication analyzer 121 will determine that this action will likely predict the initial outcome of the voice communication session because the user 102 is likely to abandon the voice communication session. In this case, the communication manager 122 can automatically transfer (changes a way the communication session is handled) the voice communication session from the IVR system 124 to an available contact center agent 131 before the user 102 abandons the voice communication session.

To further illustrate examples of how a pattern is used to predict the initial outcome of a communication session, consider the following examples. Assume that the communication session is a voice communication session, the self-service application 123 is the IVR system 124, and that the pattern that will likely predict the initial outcome of the voice communication session is that the user 102 will likely abandon the voice communication session. It has been determined from prior callers that if a caller navigates a particular IVR menu path and takes longer than two minutes to do so, that it is 80% likely that the user 102 will abandon the call. When this pattern is detected, the communication manager 122 routes the voice communication session from the IVR system 124 to the contact center agent 131 at an agent terminal 130.

In another example, assume that the communication session is a voice communication session and the self-service application 123 is the IVR system 124. In this example, the metrics are based on a language or dialect selected or spoken by the user 102 and a number of non-responses by the user 102 to one or more IVR menus. For example, a threshold may be defined that if the user 102 selects a particular dialect (which is sometimes difficult for the IVR system 124 to recognize) and if the user 102 fails to respond or respond with commands that are recognized by the IVR system 124 on two occasions (i.e., the user 102 does not respond before being prompted again), based on this pattern, the communication manager 122 can switch the voice communication session to a text based communication, such an IM communication, text, or email.

Alternatively, the pattern can be based on a positive likelihood. For example, assume that the communication session is a voice communication session and the self-service application 123 is the IVR system 124. In this example, the pattern is that the user 102 is likely not going to need to talk to a contact center agent 131. The metrics are based on a specific path navigated through a plurality of IVR menus and a time taken to navigate the specific IVR path. For example, if the user 102 selects a specific IVR menu in the path without being played the option (i.e., the user 102 has previously used the IVR system 124), and completes the path in a period which is less than a threshold (e.g., 30 seconds), the communication manager 122 can change an upcoming IVR menu to not give the user 102 the option to talk to the contact center agent 131. This is because the communication analyzer 121 has determined that there is an 80% chance that the user 102 will not need to talk to the contact center agent 131. Alternatively, the communication manager 122 could shorten the text of one or more upcoming menu items based on the 80% likelihood.

The way of managing the user in the communication session can be changed in various ways. For example, if the likelihood that the user 102 will abandon the communication session is only 60% to 79%, the communication session can be routed to a general purpose contact center agent 131. Alternatively, if the likelihood is 80% or higher, the communication session can be routed to a specific type of contact center agent 131 for handling disgruntled customers. The way of managing the user in the communication session can be changed, depending on the metrics/rules by changing one or more IVR menus, switching the communication session to a different media, conferencing in a supervisor into an IM session, automatically sending a document to the user 102, sending a callback telephone number to the user 102, and/or the like.

FIG. 3 is a flow diagram of a process for identifying one or more metrics that predict an initial outcome of a communication session. The process starts in step 300. The communication analyzer 121 automatically gathers statistics for metrics in regard to interactions/communication sessions in step 302. For example, the communication analyzer 121 can gather statistics of voice calls and the conditions on which the voice calls are abandoned or where the customer is unhappy. Similarly, the communication analyzer 121 can gather statistics of where voice calls are not abandoned. In one embodiment, the communication analyzer 121 can analyze an IM, web session, and/or social media session. The analysis can be done in real-time or after the communication session as been completed.

Based on the interactions/communication sessions, the communication analyzer 121 determines metric(s) that will likely predict the initial outcome of a future communication session. For example, the communication analyzer 121 can determine specific IVR paths navigated by a user 102, time periods, IVR conditions, and/or the like that lead to an abandonment rate over 70%. The identified metrics are then be used to create defined rules to change how the user is managed in the communication session in step 212. The process determines in step 306 if there are more interactions/communication sessions. If there are not any more interactions/communication sessions, in step 306, the process ends in step 308. Otherwise, if there are more interactions/communication sessions in step 306, the process goes to step 302.

The above process can be implemented as a thread. For example, the process of FIG. 3 can be a thread that is started each time a communication session is initiated with the self-service application 123.

The above process is a self-learning process that can predict outcomes of a communication session based on previous interactions. For example, as more interactions are analyzed, patterns of where the user had a negative interaction (e.g., a call abandonment) or a positive interaction (where the user needs were met) can be determined. These patterns can then be automatically used by the system to dynamically change how users are managed when new interactions occur.

FIG. 4 is a flow diagram of a process for prediction of contact center interactions using text based communications. The process starts in step 400. The text message server 128 establishes a text based communication session between the user 102 and a contact center agent 131 in step 402. The text based communication session can be an email communication session, a web based communication session, a text messaging communication session, an IM communication session, a chat communication session, a social media interaction, a tweet, and/or the like. The text message server 128 receives one or more text interactions between the user 102 and the contact center agent 131 in step 404. The text message server 128 can received the one or more text interactions in various ways, such as by receiving an email, receiving a text, monitoring an IM session, monitoring the social media network 140, and/or the like. The text interactions are typically on a particular topic, such as, the user 102 wanting information on a specific product offered by a company.

The communication analyzer 121 analyzes the one or more text interactions to detect a pattern in the one or more text interactions in step 406. The communication analyzer 121 can analyze the one or more text interactions for patterns in various ways, such as, analyzing the text of messages from the user 102, analyzing text of messages from the contact center agent 131, analyzing the text of the both messages from the user 102 and from the contact center agent 131. The communication analyzer 121 can analyze the text interactions for patterns based on a previous text interaction by the user 102, based on identification of one or more keywords in the one or more text interactions, based on installation of an application on a device of the user 102, based on an account of the user 102 on a web site, based on a social media posting by the user 102, based on a tweet by the user 102, based on a number of followers of the user 102 on the social media network 140 (i.e., reaching a defined number of followers), and/or the like.

The communication analyzer 121 determines, based on the pattern in the one or more text interactions, if a pattern will likely predict an initial outcome of the text interaction in step 408. The communication analyzer 121 determines in step 410 if the pattern will likely predict the initial outcome of the one or more text interactions in step 410. If the pattern will likely predict the initial outcome of the one or more text interactions in step 410, the text message server 128 changes the way the user is managed in the text interactions in step 414 and the process goes to step 412.

The pattern can be based on various criteria and/or rules. For example, the pattern can be based on detection of one or more keywords in the one or more text interactions. If the user 102 repeats the phrase "I do not understand" multiple times in a series of emails, the emails may then be copied to a supervisor or technical specialist so that the supervisor or technical specialist can be involved in the email session. This process can also work for IM, text messaging, and the social medial networks 140.

The pattern can be based on a number of emails, text messages, social media interactions, and/or the like. For example, if over 20 emails have been exchanged on a particular topic, a supervisor can be copied on the latest email. The 20 email threshold can be based on previous analysis of emails that indicate that there is a 95% likelihood that the customer is likely to be unhappy if there are over 20 emails sent on a particular product. The threshold of 20 emails can be specific to a product/service or a general threshold for all products/services.

In another embodiment, a time between text interactions can be used as a pattern or threshold. For example, if the contact center agent 131 is taking over two days to respond to an email or social media posting, the email thread/social media posting can be escalated by having a supervisor or technical specialist call the user 102 or by having the supervisor or technical specialist respond to the email/social media posting. The use of time between interactions can be combined with other metrics, such as a number of interactions over a period of time to determine the pattern. In one embodiment, the text interaction is a series of emails or social media postings between the user and the contact center agent and wherein changing the way of managing the user in the text interaction is initiating a voice communication session to the user.

In another embodiment, a supervisor or technical specialist can be included in an IM session based on detecting a pattern. For example, the pattern may be detection of a series of words spoken and/or a response time on the IM session.

If the pattern will not likely predict the initial outcome in step 410, the test message server 128 determines if the text based communication session is over in step 412. If the text based communication session is not over in step 412, the process goes to step 408. Otherwise, if the text based communication session is over in step 412, the process ends in step 416.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
receiving, by a microprocessor, a text interaction on a topic at a contact center, wherein the text interaction is between a user and a contact center agent and wherein the text interaction is a series of emails or social media postings between the user and the contact center agent;
analyzing, by the microprocessor, the text interaction to detect a pattern in the text interaction, wherein analyzing the text interaction to detect the pattern in the text interaction is based on a number of followers of the user on a social media network;
determining, by the microprocessor, based on the pattern in the text interaction, a pattern that will likely predict an initial outcome of the text interaction, wherein the pattern that will likely predict the initial outcome of the text interaction is that the user will likely be unhappy with the text interaction; and
in response to determining the pattern will likely predict the initial outcome of the text interaction, changing, by the microprocessor, a way of managing the user in the text interaction by bringing in a technical specialist or supervisor into the text interaction by initiating a voice communication session to the user.

2. The method of claim 1, wherein analyzing the text interaction to detect the pattern in the text interaction is further based on at least one of the following:
a previous text interaction by the user;
identification of one or more keywords;
installation of an application on a device of the user;
an account of the user on a web site; and
a tweet by the user.

3. The method of claim 2, wherein analyzing the text interaction to detect the pattern in the text interaction is based on installation of the application on the device of the user.

4. The method of claim 2, wherein analyzing the text interaction to detect the pattern in the text interaction is based on the previous text interaction by the user.

5. The method of claim 2, wherein analyzing the text interaction to detect the pattern in the text interaction is based on the identification of the one or more keywords.

6. The method of claim 2, wherein analyzing the text interaction to detect the pattern in the text interaction is based on the account of the user on the web site.

7. The method of claim 2, wherein analyzing the text interaction to detect the pattern in the text interaction is based on the tweet by the user.

8. The method of claim 1, wherein the text interaction is the series of emails and wherein the technical specialist or supervisor is brought into the text interaction based on a threshold number of emails in the series of emails.

9. The method of claim 1, wherein analyzing the text interaction to detect the pattern in the text interaction is based on a time between the series of emails or social media postings between the user and the contact center agent.

10. The method of claim 1, wherein the text interaction is the series of emails and wherein analyzing the text interaction to detect the pattern in the text interaction is based on identifying a phrase that is repeated multiple times in the series of emails.

11. A system comprising:
a microprocessor; and
a computer readable medium coupled with the microprocessor and comprising microprocessor readable and executable instructions that, when executed by the microprocessor, cause the microprocessor to:
receive a text interaction on a topic at a contact center, wherein the text interaction is between a user and a contact center agent and wherein the text interaction is a series of emails or social media postings between the user and the contact center agent;
analyze the text interaction to detect a pattern in the text interaction wherein analyzing the text interaction to detect the pattern in the text interaction is based on a number of followers of the user on a social media network;
determine, based on the pattern in the text interaction, a pattern that will likely predict an initial outcome of the text interaction, wherein the pattern that will likely predict the initial outcome of the text interaction is that the user will likely be unhappy with the text interaction; and
change a way of managing the user in the text interaction by bringing in a technical specialist or supervisor into the text interaction in response to determining the pattern will likely predict the initial outcome of the text interaction.

12. The system of claim 11, wherein analyzing the text interaction to detect the pattern in the text interaction is further based on at least one of the following:
a previous text interaction by the user;
identification of one or more keywords;
installation of an application on a device of the user;
an account of the user on a web site; and
a tweet by the user.

13. The system of claim 12, wherein analyzing the text interaction to detect the pattern in the text interaction is based on installation of the application on the device of the user.

14. The system of claim 12, wherein analyzing the text interaction to detect the pattern in the text interaction is based on the previous text interaction by the user.

15. The system of claim 12, wherein analyzing the text interaction to detect the pattern in the text interaction is based on the identification of the one or more keywords.

16. The system of claim 12, wherein analyzing the text interaction to detect the pattern in the text interaction is based on the account of the user on the web site.

17. The system of claim 12, wherein analyzing the text interaction to detect the pattern in the text interaction is based on the tweet by the user.

18. The system of claim 11, wherein the text interaction is the series of emails and wherein the technical specialist or supervisor is brought into the text interaction based on a threshold number of emails.

19. The system of claim 11, wherein analyzing the text interaction to detect the pattern in the text interaction is based on a time between the series of emails or social media postings between the user and the contact center agent.

20. The system of claim 11, wherein the text interaction is the series of emails and wherein analyzing the text interaction to detect the pattern in the text interaction is based on identifying a phrase that is repeated multiple times in the series of emails.

* * * * *